United States Patent [19]

Walrath

[11] Patent Number: 4,500,823

[45] Date of Patent: Feb. 19, 1985

[54] ELECTRO-OPTICAL TRACKING SYSTEM WITH ADAPTIVE BEARING FRICTION COMPENSATION

[75] Inventor: Craig D. Walrath, Catonsville, Md.

[73] Assignee: Westinghouse Electric Corp., Pittsburgh, Pa.

[21] Appl. No.: 469,876

[22] Filed: Feb. 25, 1983

[51] Int. Cl.³ ........................... G05D 23/275
[52] U.S. Cl. ..................... 318/632; 318/648; 318/561
[58] Field of Search ............ 318/632, 648, 561, 689

[56] References Cited

U.S. PATENT DOCUMENTS

| | | | |
|---|---|---|---|
| 3,518,016 | 6/1970 | Burdin et al. | 356/248 |
| 3,988,659 | 10/1976 | Ambrosini | 318/648 |
| 4,021,716 | 5/1977 | Rue | 318/648 |
| 4,196,380 | 4/1980 | Gustavsson et al. | 318/648 X |
| 4,451,769 | 5/1984 | Minnich et al. | 318/689 |

OTHER PUBLICATIONS

Gilbert et al; "Adaptive Compensation of an Optical Tracking Telescope", Automatica, vol. 10, pp. 125–131, Pergamon Press (1974).
Dahl, "Measurement of Solid Friction Parameters of Ball Bearings", Symposium of Motion Control, (1977) University of Illinois.
Salisbury, "Active Stiffness Control of a Manipulator in Cartesian Coordinates" 19th IEEE Conference on Decision and Control, vol. I, Dec. 1980.
Handlykken et al., "Control System Analysis and Synthesis for Six Degree Freedom Universal Force Reflecting Hand Controller, 19th IEEE Conference on Decision and Control, vol. 1, Dec. 1980.
Luh et al., "Joint Torque Control by Direct Feedback for Industrial Robots", 20 IEEE Conference on Decision and Control. vol. 1, Dec. 1981.
Wu et al., "Manipulator Compliance Based on Joint Torque Control", vol. 1, Dec. 1980.

Primary Examiner—B. Dobeck
Attorney, Agent, or Firm—W. G. Sutcliff

[57] ABSTRACT

A system is detailed for adaptively compensating for gimbal bearing friction in a gimbal mounted electro-optical system. The system is based on real-time compensation of a predictive value for gimbal bearing friction based on input transducer data to produce a friction compensation output, which is applied to the gimbal drive producing a torque which is equal and opposed to the bearing friction torque to minimize stabilization errors. The system adapts to match friction behavior in both amplitude and transient response (i.e. bandwidth) characteristics.

6 Claims, 4 Drawing Figures

ELECTRO-OPTICAL TRACKING SYSTEM WITH ADAPTIVE BEARING FRICTION COMPENSATION

GOVERNMENT CONTRACT

The invention herein described was made in the course of or under a contract or subcontract with the Department of the Army.

BACKGROUND OF THE INVENTION

The present invention is directed to electro-optical tracking systems, and particularly airborne systems requiring stabilization. In such systems the optical sensor or mirror focused on the optical sensor is mounted on a gimbal which permits tracking along the desired line-of-sight to a target. The system must permit the sensor to track along the line-of-sight despite motions of the aircraft. Such an aircraft-mounted electro-optical system is termed a heliostat and provides a space stabilized look direction from the aircraft.

A prior art stabilization system for maintaining a fixed line-of-sight of an optical instrument on an aircraft is described in U.S. Pat. No. 3,518,016. Such system comprises a line-of-sight mirror mounted on a gimbal, with servo motors for rotating the mirror about the gimbal axis, and wherein gyros sense motion about the gimbal axis to generate feedback control signals which are applied to torque motors for controlling mirror rotation.

In another such gimbaled tracking system seen in U.S. Pat. No. 4,021,716, the angular velocities of the rotating members are sensed to provide a feedback signal for providing torque compensation, which includes bearing friction torque compensation.

The line-of-sight stabilization error of an airborne pointing and tracking system caused by response to gimbal bearing friction torque is often of sufficient magnitude to be the object of an intense design effort. Similarly, friction can limit the smoothness of robot motion trajectories. In the airborne tracking system, this torque impinges on the stabilized member of the system's gimbal as a function of relative angular motion between that element and the gimbal's base (i.e., the aircraft). It is counteracted in conventional systems by the torque motor of a stabilization feedback loop. An inertial sensor (a gyro, for example) mounted on the stabilized member is used as the feedback element. The loop functions to produce corrective motor torque in proportion to error measured by the feedback sensor. The constant of proportionality associated with this feedback process is often referred to as the stabilization stiffness and may be functionally thought of as a spring which connects the stabilized member to, and attempts to fix it in, inertial space.

While conventional feedback operation greatly reduces friction-related errors, it is often by an insufficient amount. Minimum bearing friction levels are often fixed by system weight, geometry, and vibration environment. Maximum stabilization stiffnesses are likewise limited by loop stability considerations, sensor noise, gimbal size and structural resonances. Taken together, then, the ratio of friction torque to stiffness often yields stabilization errors which are unacceptably large given the required compatibility with other system constraints.

A solution to these conflicting requirements is possible if friction torque can be accurately predicted in real-time. A counteracting command can then be applied to the stabilization subsystem which negates the friction torque before its effect is measured by the feedback sensor. Now, instead of being proportional to full friction levels, stabilization error is proportional to the much smaller mismatch between actual friction torque and that predicted by the model.

The detailed knowledge of friction behavior necessary to achieve accurate real-time modeling has, however, previously been lacking. This is particularly true concerning the transient behavior of friction caused by relative motion polarity reversals of the system's gimbal members, a particular problem in airborne stabilization systems where reversals occur quite frequently in response to aircraft motions.

Conventional analysis of this bearing friction has not proven satisfactory. Such analysis had suggested that the transition time in going from opposite polarity, fixed values of rolling friction is inversely related, in a non-linear manner to the magnitude of relative bearing motion.

FIG. 2 of the drawings is a plot illustrating the friction torque waveform versus time based on experimental observations. This plot shows a transition time $\tau$, from one rolling friction torque value $+T_c$ to the other $-T_c$.

It has been determined that the optimum time constant associated with the transition time for minimized motion of the stable element as seen in FIG. 2 is actually strongly correlated with the magnitude of relative bearing acceleration, and can be closely approximated to $$\frac{1}{\tau_{OPT}} = 1 + 0.37\, \ddot{\lambda}_{RMS}\, \sec^{-1}$$

where $\tau_{OPT}$ is the optimum exponential time constant and $\ddot{\lambda}_{RMS}$ is the root mean square relative bearing angular acceleration in deg/sec/sec. The value 0.37 is a representative value had from a specific system that was analyzed and has to be determined for each specific system.

SUMMARY OF THE INVENTION

A method and apparatus is provided to adaptively compensate for gimbal bearing friction in an electro-optical system in which an optical sensor is aimed and maintained along a desired line-of-sight. The optical sensor is mounted on a gimbal having at least one axis of rotation relative to a gimbal bearing axis for aiming along the line-of-sight. The electro-optical system includes synchro means for sensing angular motion of the gimbal axis. The system includes tracker means for determining angular stabilization errors from the line-of-sight with feedback means coupled to gimbal drive means for stabilizing the angular motion of the gimbal axis.

The adaptive compensation for gimbal bearing friction is based on a predicted real-time friction torque value arrived at from dynamic friction characteristic analysis, and adaptively adjusted into agreement with actual friction behavior by processing input from the conventional synchro and tracker sensors. A friction compensation signal is added to conventional stabilization commands such that the resultant gimbal motor torque is equal and opposed to the actual friction disturbance, such that the residual torque and stabilization errors are minimized.

The adaptive compensation is carried out with the friction behavior algorithm implemented in software with computing means.

DESCRIPTION OF THE PREFERRED EMBODIMENTS

Figure 1:
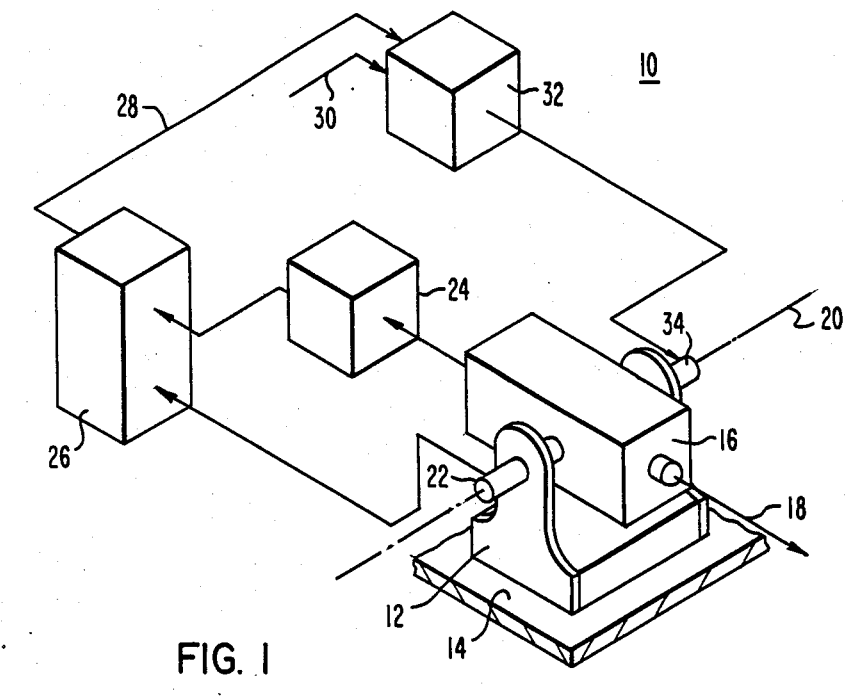
FIG. 1 is a schematic illustration of the electro-optical system of the present invention.
Figure 2:
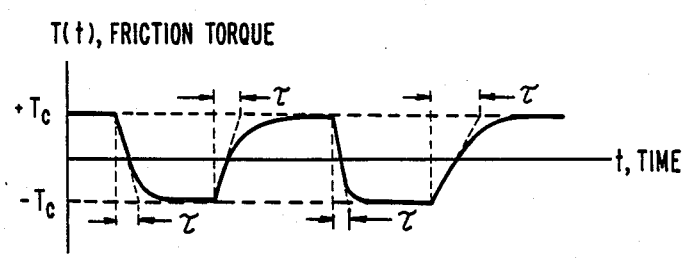
FIG. 2 is a plot of gimbal bearing friction behavior with friction value plotted against time.

The electro-optical system 10 of the present invention is best understood by reference to the exemplary embodiment seen in FIG. 1. The electro-optical system 10 includes a gimbal 12 mounted on frame of reference 14, such as an airframe. The gimbal 12 for purposes of simplifying the discussion is shown as a single axis device, but would in general include plural adjustable rotational axes. Such gimbals 12 are well known in the art for aiming an optical sensor 16 along a line-of-sight 18. The gimbal 12 is shown with an axis of rotation 20 about which the gimbal is rotated to correct for motion of the airframe 14 to maintain the sensor aimed along the line-of-sight.

A synchro means 22 is mounted relative to the gimbal axis of rotation 20 for measuring relative gimbal angular rotation. A tracker means 24 measures angular stabilization errors relative to the line-of-sight to provide feedback information which along with the output of the synchro means 22 is inputted to digital computing means 26. The predictive friction algorithm is stored in computing means 26 and real-time computation is performed using the inputs from the synchro means and tracker means to adaptively predict the instantaneous value of torque exerted by gimbal bearing friction on the stabilized sensor. The resultant signal is outputted from computing means 26 and converted to an analog signal 28 by a D/A converter, not shown. This analog signal is added to the servo control signal 30 from the conventional servo feedback control system, not shown, and fed through power amplifier 32 to drive the gimbal-mounted torque motor 34. The motor torque produced is thus in part had from the analog signal 28, and this part of the motor torque is equal and opposed to gimbal bearing friction. The effective torque is thus at a null.

Figure 3:
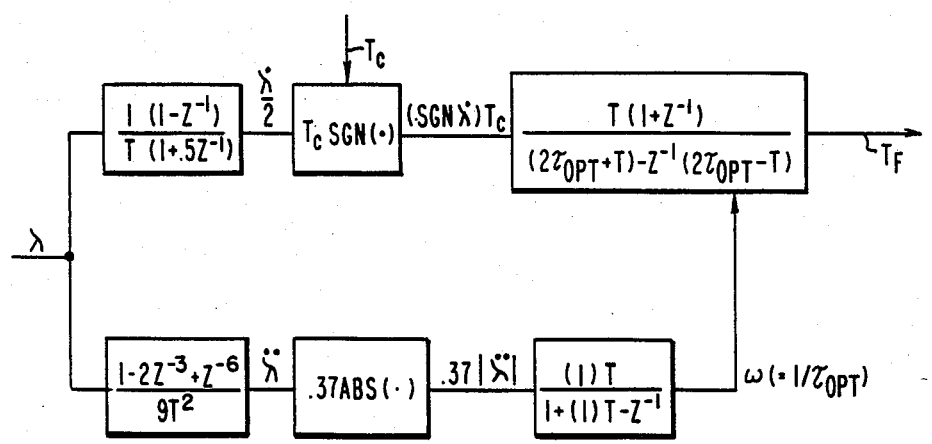
FIG. 3 is a block diagram of the computational algorithms which illustrates the operation of the adaptive bearing friction compensation technique of the present invention.

FIG. 3 illustrates in a functional block diagram the friction compensator algorithms which are carried out in the computing means 26. The gimbal relative bearing angle change $\lambda$ input is had from the synchro, and the first time derivative or velocity of gimbal relative bearing angle change $\dot{\lambda}$ and the second time derivative or acceleration of gimbal relative bearing angle $\ddot{\lambda}$ are derived therefrom. In this block diagram, T is the computational interval, Z is the conventional Z-transformer operator, $\tau_{OPT}$ is the optimum exponential time constant as defined above, $T_c$ is the rolling friction torque value, and $\omega$ is the frequency which is equal to $1/\tau_{OPT}$.

The notation $Z^{-1}$, $Z^{-3}$, and $Z^{-6}$ refers to respectively the last sampled value of gimbal angle, the third last and sixth last sampled values for gimbal angle.

The predicted friction torque $T_F$ is modeled by the differential equation $$T_F(t) + \tau \frac{dT_F(t)}{dt} = (SGN \, \lambda)T_c$$

with $\tau$ being the exponential time constant, $T_c$ being the constant rolling friction torque, and (SGN $\lambda$) is + or −1 for the sign of relative gimbal velocity.

As seen in FIG. 3, the variable $\ddot{\lambda}$ gimbal angle acceleration is calculated from $\lambda$ and is used to adaptively adjust the time constant $\tau$. Following calculation of $\ddot{\lambda}$ and scaling, the absolute value $0.37|\ddot{\lambda}|$ is operated on by a low-pass digital filter to provide $\omega$, the desired effective friction bandwith.

The adaptive bandwidth low-pass filter is used to predict the friction torque $T_F$ from the input values (SGN $\dot{\lambda})T_c$, and $\omega=1/\tau_{OPT}$ applied to the differential equation for predicted friction torque. The resulting $T_F$ is a real-time prediction of bearing friction torque. This value is added to existing drive commands and applied to the gimbal torque motor. The net effect is to negate friction torque by producing an equal and opposite component of motor torque.

Figure 4:
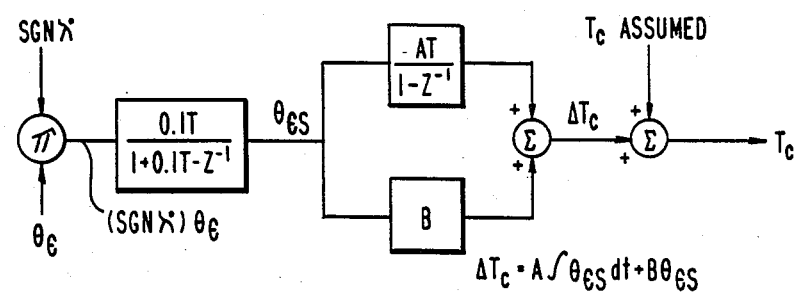
FIG. 4 is a block diagram of the computational algorithms which illustrates how to adjust the amplitude of the rolling friction compensation level setting in the technique illustrated in FIG. 3.

FIG. 4 illustrates in a functional block diagram how to adjust the value $T_c$ of rolling friction torque applied in FIG. 3. The value $T_c$ can be expected to change as a function of bearing age, temperature and other well known factors. The adjustment is made using the tracker error signal $\theta_E$ which is modulated by the previously generated SGN $\lambda$ variable. The resulting function (SGN $\dot{\lambda})\theta_E$ will have a non-zero average value only if a correlation exists between SGN $\lambda$ and $\theta_E$, i.e., only if there is a friction-induced component of error. The polarity of the average value will be determined by whether $\dot{\lambda}$ and $\theta_E$ are in-phase or out-of-phase.

The average value $\theta_{ES}$ is extracted by the extreme smoothing action of a 0.1 RAD/SEC bandwidth low-pass digital filter. A negative result is indicative of overcorrection by the compensator (i.e., too large an assumed $T_c$ value), while a positive value is a measure of the amount of under-correction.

$\theta_{ES}$ is operated on by a proportional plus integral control algorithm which generates the required correction to the assumed value of $T_c$. The required change is:

$$\Delta T_c = A \int \theta_{ES} dt B \theta_{ES}$$

$\Delta T_c$ is added (or subtracted, depending on polarity) from the assumed $T_c$ value and this adjusted value of $T_c$ is used by the adaptive compensator shown in FIG. 3 to null $\theta_{ES}$, the friction induced component of stabilization error measured by the video tracer. A and B are constants chosen for stability of this continuous, closed loop process. These constants determine loop response characteristics which will be minimal for following slowly changing rolling friction levels.

The net result is a friction compensator which is now adaptive in both transient and steady-state behavior. It will automatically model and compensate for frictional torque changes caused by relatively rapidly varying base motions and the extremely slow changes related to age and environmental conditions.

The invention has been described with respect to an electro-optical system having only one gimbal rotational axis, but is applicable to plural gimbal rotational axis systems.

The invention has been described in the context of an aircraft-mounted heliostat but is not limited thereto. The invention is applicable to the field of robotics for joint control or where an electro-optical sensor is focused on a workpiece or tool and a manipulator is to be controlled in its motion and operation.

I claim:

1. A system for adaptively compensating for gimbal bearing friction in an electro-optical system in which an optical sensor is aimed and maintained directed along a desired line-of-sight, with the optical sensor mounted on a gimbal having at least one axis of rotation relative to a gimbal bearing axis for aiming the sensor along the line-of-sight, which electro-optical system includes synchro means for sensing angular motion of the gimbal axis relative to a stable base frame of reference with feedback means coupled to a gimbal rotational drive means for stabilizing the angular motion of the gimbal axis, and wherein compensation signal means generates a real-time adaptive compensation signal which is predictive of gimbal bearing friction torque, which compensation signal is added to the gimbal rotational drive signal to negate bearing friction by producing a component of rotational torque which is equal and opposite to the torque from bearing friction.

2. The system set forth in claim 1, wherein the synchro means senses the angular motion of the gimbal axis relative to the stable base, and including means for digitizing the gimbal angular value and applying this digitized value along with a predetermined digitized value of bearing rolling friction to digital computing means for computing the bearing friction torque compensation signal.

3. The system set forth in claim 2, wherein means are included for adjusting the amplitude of the bearing rolling friction signal.

4. The system set forth in claim 3, wherein the means for adjusting the amplitude of the bearing rolling friction signal includes means for correlating an angular stabilization error signal had from tracker means, with the sign of the first derivative of gimbal angle, and computing an amplitude adjusted value for bearing rolling friction.

5. A method of adaptively compensating for gimbal bearing friction in an electro-optical system in which an optical sensor is aimed and maintained directed along a desired line-of-sight, with the optical sensor mounted on a gimbal having at least one axis of rotation relative to a gimbal bearing axis for aiming along the line-of-sight, which electro-optical system includes synchro means for sensing gimbal axis angle with feedback means coupled to a gimbal rotational drive means for stabilizing the gimbal axis angular motion, which method comprises generating in real-time an adaptive compensation signal which represents a prediction of gimbal bearing friction torque, and adding this compensation signal to the gimbal rotational drive signal to negate friction torque by producing a component of rotational torque which is equal and opposite to bearing friction torque.

6. The method set forth in claim 5, wherein the generation of the adaptive compensation signal includes adjustment of the value of the amplitude of rolling bearing friction based on sensing of angular stabilization errors from the desired line-of-sight by the tracker means.

* * * * *